United States Patent
Ohtsubo et al.

(10) Patent No.: US 10,821,598 B2
(45) Date of Patent: Nov. 3, 2020

(54) ROBOT AND ROBOT SYSTEM

(71) Applicant: KABUSHIKI KAISHA YASKAWA DENKI, Kitakyushu (JP)

(72) Inventors: Naoyuki Ohtsubo, Kitakyushu (JP); Tsuyoshi Ito, Kitakyushu (JP); Tsuyoshi Konno, Kitakyushu (JP); Yuji Ishimaru, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 171 days.

(21) Appl. No.: 16/102,810

(22) Filed: Aug. 14, 2018

(65) Prior Publication Data
US 2019/0061145 A1    Feb. 28, 2019

(30) Foreign Application Priority Data

Aug. 31, 2017 (JP) ................................ 2017-166854

(51) Int. Cl.
  *B25J 17/00* (2006.01)
  *B25J 17/02* (2006.01)
  (Continued)

(52) U.S. Cl.
  CPC ......... *B25J 9/0024* (2013.01); *B23K 11/3072* (2013.01); *B25J 15/0019* (2013.01);
  (Continued)

(58) Field of Classification Search
  CPC . B25J 9/0024; B25J 17/02; B25J 18/00; B25J 19/0025
  See application file for complete search history.

(56) References Cited

U.S. PATENT DOCUMENTS

2013/0305869 A1* 11/2013 Krumbacher ............ B25J 17/02
                                                        74/490.06
2014/0047940 A1*  2/2014 Yamamoto ............... B25J 17/00
                                                        74/490.05
(Continued)

FOREIGN PATENT DOCUMENTS

| JP | 5-131388 A   | 5/1993 |
| JP | 2002-239969 A | 8/2002 |
| JP | 2011-067893 A | 4/2011 |

OTHER PUBLICATIONS

Office Action dated Dec. 27, 2019 in corresponding Japanese Patent Application No. 2017-166854 (with English Translation), citing documents AO and AP therein, 10 pages.

*Primary Examiner* — Jake Cook
(74) *Attorney, Agent, or Firm* — Oblon, McClelland, Maier & Neustadt, L.L.P.

(57) ABSTRACT

A robot is provided which has: a first arm portion to which an end effector is attached, a second arm portion configured to support, at a tip portion thereof, the first arm portion swingably about a first axis, a third arm portion configured to support a base end portion of the second arm portion rotatably about a second axis orthogonal to the first axis, a tube arranged from the base end portion side toward the tip portion side of the second arm portion and connected to the end effector; and a first recess portion and a second recess portion, which are formed along an arrangement direction of the tube between the base end portion and the tip portion on one side and the other side in a direction orthogonal to both of the first and second axes, respectively.

13 Claims, 7 Drawing Sheets

(51) Int. Cl.
  *B25J 18/00* (2006.01)
  *B25J 9/00* (2006.01)
  *B23K 11/30* (2006.01)
  *B25J 15/00* (2006.01)
  *B25J 19/00* (2006.01)
  *B23K 11/31* (2006.01)

(52) U.S. Cl.
  CPC ......... *B25J 18/007* (2013.01); *B25J 19/0025* (2013.01); *B23K 11/314* (2013.01)

(56) References Cited

U.S. PATENT DOCUMENTS

| | | | |
|---|---|---|---|
| 2014/0102240 A1* | 4/2014 | Inada | B25J 19/0029 74/490.02 |
| 2016/0089778 A1* | 3/2016 | Yokota | B25J 9/06 74/490.01 |
| 2018/0326574 A1* | 11/2018 | Cao | B25J 9/0009 |
| 2019/0275685 A1* | 9/2019 | Murakami | B25J 19/0029 |

\* cited by examiner

ROBOT AND ROBOT SYSTEM

CROSS-REFERENCE TO RELATED APPLICATION

This application claims priority from Japanese Patent Application No. 2017-166854 filed with the Japan Patent Office on Aug. 31, 2017, the entire content of which is hereby incorporated by reference.

BACKGROUND

1. Field of the Invention

The present disclosure relates to a robot and a robot system.

2. Description of the Related Art

A welding robot is described in JP-A-2011-67893 (FIG. 3). The welding robot includes an upper arm having a pair of coupling portions extending in parallel. A guide surface having a curved surface that can guide a torch cable is provided between base ends of the coupling portions.

SUMMARY

In order to solve the above problem, one aspect of the embodiment provides a robot including a first arm portion to which an end effector is attached, a second arm portion configured to support, at a tip portion thereof, the first arm portion swingably about a first axis, a third arm portion configured to support a base end portion of the second arm portion rotatably about a second axis orthogonal to the first axis, a tube arranged from the base end portion side toward the tip portion side of the second arm portion and connected to the end effector, and a first recess portion and a second recess portion, which are formed along an arrangement direction of the tube between the base end portion and the tip portion on one side and the other side in a direction orthogonal to both of the first and second axes, respectively.

Moreover, according to another aspect of the embodiment provides a robot system having a robot including a first arm portion to which an end effector is attached, a second arm portion configured to support, at a tip portion thereof, the first arm portion swingably about a first axis, a third arm portion configured to support a base end portion of the second arm portion rotatably about a second axis orthogonal to the first axis, a tube arranged from the base end portion side toward the tip portion side of the second arm portion and connected to the end effector, and a first recess portion and a second recess portion, which are formed along an arrangement direction of the tube between the base end portion and the tip portion on one side and the other side in a direction orthogonal to both of the first and second axes, respectively; and a spray gun attached to the first arm portion.

DESCRIPTION OF THE EMBODIMENTS

Figure 1:
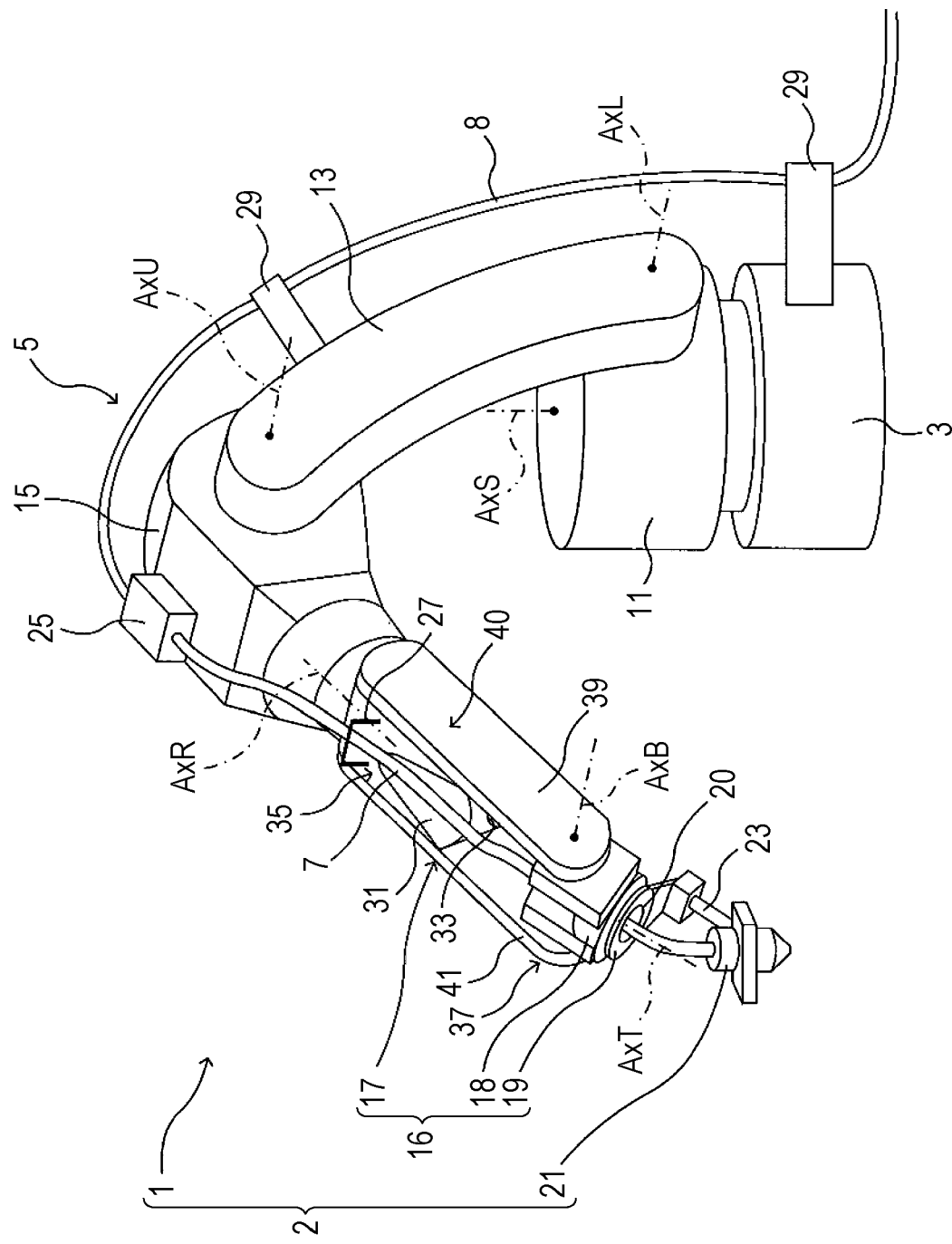
FIG. 1 is an explanatory view showing an example of the entire configuration of a robot and a robot system according to one embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One embodiment is described hereinafter with reference to the drawings.

1. Entire Configuration of Robot and Robot System

An example of the entire configuration of a robot 1 according to the embodiment is described with reference to FIG. 1.

As illustrated in FIG. 1, the robot 1 includes a base 3, an arm 5, and a paint tube 7 (an example of a tube). The arm 5 has six moving portions in this example. The robot 1 is configured as a six-axis vertical articulated single arm robot. The robot 1 and a spray gun 21 attached to a third wrist moving portion 19 described below configure a robot system 2.

2. Configuration of Arm

As illustrated in FIG. 1, the arm 5 is coupled to the base 3 in such a manner as to be turnable about an S-axis AxS being an axis in the vertical direction. In the specification, an end, on the base 3 side, of each moving portion of the arm 5 is defined as the "base end" of the moving portion, and an end opposite to the base 3 is defined as the "tip" of the moving portion. The arm 5 includes a rotating head 11, a lower arm 13, an upper arm 15, and a wrist 16 having three moving portions.

The rotating head 11 is supported by the base 3 in such a manner as to be rotatable about the S-axis AxS. The rotating head 11 rotates about the S-axis AxS with respect to the base 3 with the drive of a motor (not illustrated) housed in the base 3 or the rotating head 11.

The lower arm 13 is supported by a side portion of the rotating head 11 in such a manner as to be rotatable about an L-axis AxL being the axis of rotation orthogonal to the S-axis AxS. The lower arm 13 rotates about the L-axis AxL with respect to the side portion of the rotating head 11 with the drive of a motor (not illustrated) provided near a joint with the rotating head 11.

The upper arm 15 (an example of a third arm portion) is supported by a tip portion of the lower arm 13 in such a manner as to be rotatable about a U-axis AxU being the axis of rotation parallel to the L-axis AxL. The upper arm 15 rotates about the U-axis AxU with respect to the tip portion of the lower arm 13 with the drive of a motor (not illustrated) provided near a joint with the lower arm 13.

The wrist 16 is coupled to a tip portion of the upper arm 15. The wrist 16 includes a first wrist moving portion 17, a second wrist moving portion 18, and the third wrist moving portion 19.

A base end portion 35 of the first wrist moving portion 17 (an example of a second arm portion) is supported by the tip portion of the upper arm 15 in such a manner as to be rotatable about an R-axis AxR (an example of a second axis) being the axis of rotation orthogonal to the U-axis AxU. The first wrist moving portion 17 rotates about the R-axis AxR with respect to the tip portion of the upper arm 15 with the drive of a motor (not illustrated) placed near a joint with the upper arm 15.

The second wrist moving portion 18 (an example of a first arm portion) is supported by a tip portion 37 of the first wrist moving portion 17 in such a manner as to be rotatable (swingable) about a B-axis AxB (an example of a first axis) being the axis of rotation orthogonal to the R-axis AxR. The second wrist moving portion 18 rotates (swings) about the B-axis AxB with respect to the tip portion of the first wrist moving portion 17 with the drive of a B-axis motor 45 (refer to FIGS. 2 and 5 described below) placed in the first wrist moving portion 17.

The third wrist moving portion 19 (an example of the first arm portion) is supported by a tip portion of the second wrist moving portion 18 in such a manner as to be rotatable about a T-axis AxT (an example of a third axis) being the axis of rotation orthogonal to the B-axis AxB. The third wrist moving portion 19 rotates about the T-axis AxT with respect to the tip portion of the second wrist moving portion 18 with the drive of a T-axis motor 43 (refer to FIGS. 2 and 5 described below) placed in the first wrist moving portion 17.

The second wrist moving portion 18 and the third wrist moving portion 19 have a hollow portion 20 into which the paint tube 7 is inserted. Moreover, the spray gun 21 is attached as an end effector to the third wrist moving portion 19 via a holder 23.

The robot 1 can be used for various applications such as painting, welding, assembly, and processing depending on the type of end effector to be attached. In the embodiment, the spray gun 21 is attached to the tip of the third wrist moving portion 19. The robot 1 is used for paint applications.

The paint tube 7 is arranged from the base end portion 35 side toward the tip portion 37 side on the outer side (upper side) of the first wrist moving portion 17. The paint tube 7 is connected to the spray gun 21 through the hollow portion 20 of the second wrist moving portion 18 and the third wrist moving portion 19. A color change valve (CCV) 25 for changing the color of paint is placed on an outer side surface (upper surface) of the upper arm 15. An end opposite to the spray gun 21 of the paint tube 7 is connected to a secondary side of the color change valve 25.

A first surface of the color change valve 25 is connected to a plurality of (only one of them is illustrated by example to avoid complexity) paint tubes 8 arranged along the outer sides of the base 3, the lower arm 13, and the upper arm 15, according to the colors. The paint tube 8 is supported by a plurality of brackets, for example, a bracket 29 provided on the outer side of the base 3 and a bracket 29 provided on the outer side of the lower arm 13. An end, which is opposite to the color change valve 25, of the paint tube 8 is connected to, for example, a paint tank of each color (whose illustration is omitted and which includes a pump and the like).

The configuration of the above-mentioned arm 5 is an example. The arm 5 may have a configuration other than the above one. For example, the color change valve 25 may be mounted in any other place on the arm 5 than the upper arm 15 (for example, the lower arm 13). Moreover, the color change valve 25 may be placed in another place (for example, an inner wall surface of a paint booth) without being placed on the robot 1. Furthermore, a device related to painting other than the color change valve 25, for example, an air-operated valve (AOPR), may be mounted.

Moreover, the directions of the axes of rotation of the moving portions of the arm 5 are not limited to the above directions. The directions of the axes of rotation may be other directions. Moreover, the numbers of the moving portions of the wrist 16 and the arm 5 are not limited to three and six, respectively. These numbers may be other numbers.

3. Detailed Structure of First Wrist Moving Portion

Figure 2:
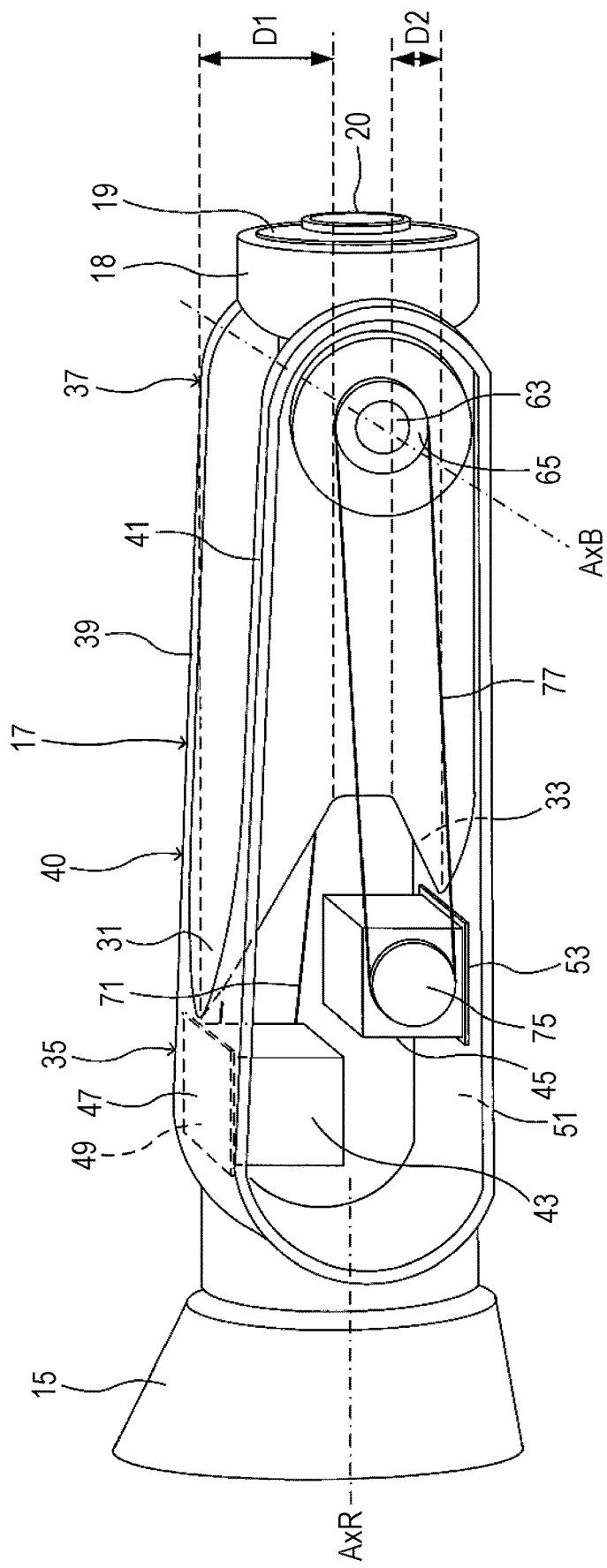
FIG. 2 is an explanatory view showing an example of the internal configuration of a first wrist moving portion.
Figure 3:
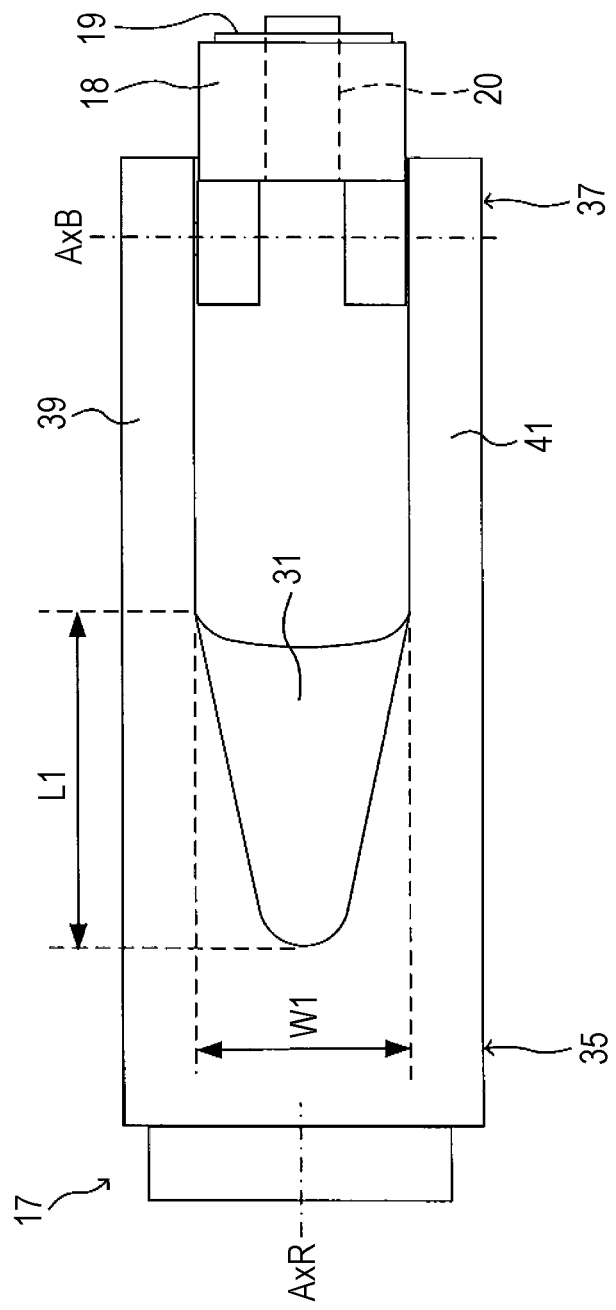
FIG. 3 is a plan view showing an example of the shape of a first recess portion of the first wrist moving portion when viewed from the outer side.
Figure 4:
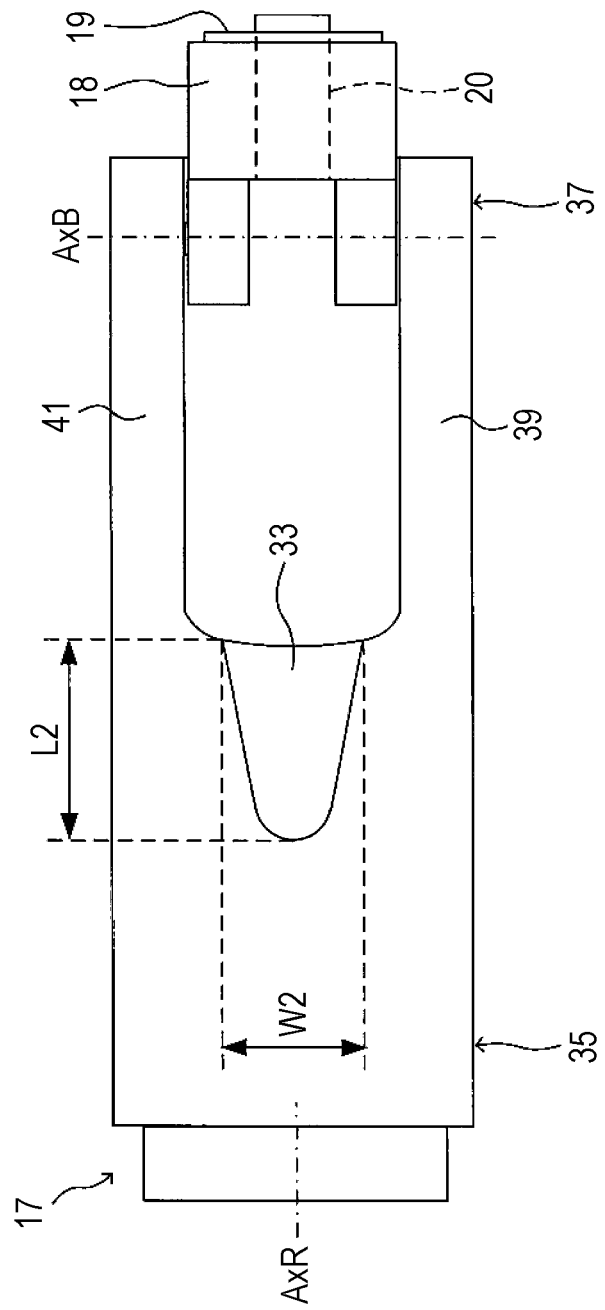
FIG. 4 is a plan view showing an example of the shape of a second recess portion of the first wrist moving portion when viewed from the inner side.
Figure 5:
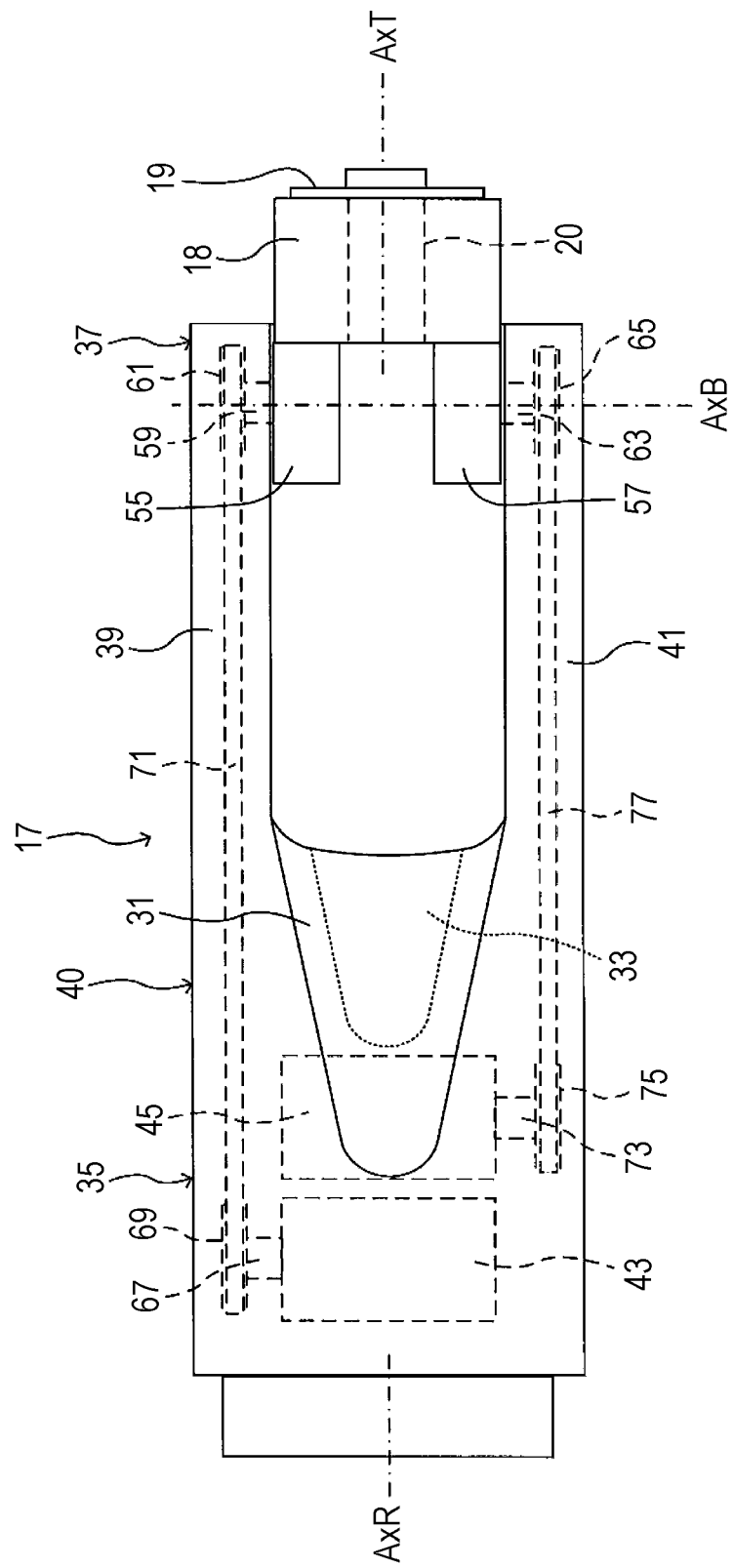
FIG. 5 is an explanatory view showing an example of the placement configuration of a B-axis motor and a T-axis motor of the first wrist moving portion.

Next, an example of the detained structure of the first wrist moving portion 17 is described with reference to FIGS. 2 to 5. FIG. 2 is an explanatory view showing an example of the internal structure of the first wrist moving portion 17 (a state where a side plate on a forked portion 41 side of a housing 40 has been removed). Moreover, FIG. 3 is a plan view showing an example of the shape of a first recess portion 31 of the first wrist moving portion 17 when viewed from the outer side. FIG. 4 is a plan view showing an example of the shape of a second recess portion 33 of the first wrist moving portion 17 when viewed from the inner side. Moreover, FIG. 5 is an explanatory view showing an example of the placement configuration of the B-axis motor and the T-axis motor of the first wrist moving portion 17.

As illustrated in FIG. 2, the first recess portion 31 and the second recess portion 33 are formed in the housing 40 of the first wrist moving portion 17. The first recess portion 31 is formed on one side (the upper side in FIG. 2) in a direction (the up-and-down direction in FIG. 2) orthogonal to both of the B-axis AxB and the R-axis AxR. The second recess portion 33 is formed on the other side (the lower side in FIG. 2). Each of the first recess portion 31 and the second recess portion 33 is formed along the arrangement direction of the paint tube 7 between the base end portion 35 and the tip portion 37. The first recess portion 31 and the second recess portion 33 are formed in such a manner that the depth of the depression in the orthogonal direction and the width in the B-axis AxB direction increase from the base end portion 35 side toward the tip portion 37 side of the housing 40. Consequently, the first recess portion 31 and the second recess portion 33 communicate with each other in the orthogonal direction. Moreover, the tip portion 37 of the first wrist moving portion 17 has a forked shape (a shape including a forked portion 39 and the forked portion 41).

As illustrated in FIG. 2, the depth of the depression of the first recess portion 31 in the orthogonal direction reaches a maximum depth D1 at a tip portion of the first recess portion 31. On the other hand, the depth of the depression of the second recess portion 33 in the orthogonal direction reaches a maximum depth D2 at a tip portion of the second recess portion 33. The maximum depth D1 of the first recess portion 31 is greater than the maximum depth D2 of the second recess portion 33 (D1>D2).

As illustrated in FIG. 3, the width of the depression of the first recess portion 31 in the B-axis AxB direction reaches a maximum width W1 at the tip portion of the first recess portion 31. Moreover, the length of the first recess portion 31 in the R-axis AxR direction is L1. On the other hand, as illustrated in FIG. 4, the width of the depression of the second recess portion 33 in the B-axis AxB direction reaches a maximum width W2 at the tip portion of the second recess portion 33. Moreover, the length of the second recess portion 33 in the R-axis AxR direction is L2. The maximum width W1 of the first recess portion 31 is greater than the maximum width W2 of the second recess portion 33 (W1>W2). The length L1 of the first recess portion 31 is greater than the length L2 of the second recess portion 33 (L1>L2).

As illustrated in FIG. 1, the paint tube 7 connected to a second surface of the color change valve 25 is arranged from the base end portion 35 toward the tip portion 37 while led from the outer side of the upper arm 15 to the outer side (upper side) of the first wrist moving portion 17, as well as housed and guided in the first recess portion 31. The paint tube 7 is inserted into the hollow portion 20 provided in the second wrist moving portion 18 and the third wrist moving portion 19, and connected to the spray gun 21. A holder may be provided in an appropriate portion on the upper arm 15 or the first wrist moving portion 17 to guide the paint tube 7 to the first recess portion 31. In the example illustrated in FIG. 1, for example, a holder 27 is provide on the outer side (upper side) of the base end portion 35 of the first wrist moving portion 17. Moreover, a holder may be provided in or near the first recess portion 31 in addition to or instead of the holder 27.

As illustrated in FIGS. 2 and 5, the T-axis motor 43 (an example of a first motor) and the B-axis motor 45 (an example of a second motor) are provided inside the base end portion 35 of the housing 40. The T-axis motor 43 is placed on one side (the upper side in FIG. 2 and the front side with respect to the paper surface in FIG. 5) in the direction orthogonal to both of the B-axis AxB and the R-axis AxR (the up-and-down direction in FIG. 2 and the direction orthogonal to the paper surface in FIG. 5) inside the base end portion 35. On the other hand, the B-axis motor 45 is placed on the other side (the lower side in FIG. 2 and the back side with respect to the paper surface in FIG. 5) in the orthogonal direction inside the base end portion 35. Moreover, the T-axis motor 43 and the B-axis motor 45 are placed in different positions in the R-axis AxR direction. In this example, the T-axis motor is placed on the base end side, and the B-axis motor 45 is placed on the tip side.

As illustrated in FIG. 2, the T-axis motor 43 is placed on the one end side in the base end portion 35 of the housing 40 in such a manner as to be in contact via a thermal conductive sheet 49 (an example of a first thermal conductive sheet) with an inside of a flat portion 47 (an example of a first flat portion) formed on the upper arm 15 side of the first recess portion 31. On the other hand, the B-axis motor 45 is placed on the other side in the base end portion 35 of the housing 40 in such a manner as to be in contact via a thermal conductive sheet 53 (an example of a second thermal conductive sheet) with an inside of a flat portion 51 (an example of a second flat portion) formed on the upper arm 15 side of the second recess portion 33.

As illustrated in FIG. 5, a first support portion 55 and a second support portion 57 that support the second wrist moving portion 18 are placed between tip portions of the forked portions 39 and 41 of the first wrist moving portion 17. Unillustrated gear mechanism and reduction gear are provided inside the first support portion 55 and the second wrist moving portion 18. The gear mechanism and the reduction gear rotate the third wrist moving portion 19 about the T-axis AxT. Unillustrated gear mechanism and reduction gear are provided inside the second support portion 57. The gear mechanism and the reduction gear rotate (swing) the second wrist moving portion 18 about the B-axis AxB. In the forked portion 39, a driven pulley 61 is attached to an input shaft 59 on the first support portion 55 side. In the forked portion 41, a driven pulley 65 is attached to an input shaft 63 on the second support portion 57 side.

In the base end portion 35 of the housing 40, a driving pulley 69 is attached to an output shaft 67 of the T-axis motor 43. A belt 71 extends between the driving pulley 69 and the driven pulley 61. In the base end portion 35 of the housing 40, a driving pulley 75 is attached to an output shaft 73 of the B-axis motor 45. A belt 77 extends between and winds around the driving pulley 75 and the driven pulley 65. The T-axis motor 43 drives the input shaft 59 via the belt 71 to rotate the third wrist moving portion 19 about the T-axis AxT. The B-axis motor 45 drives the input shaft 63 via the belt 77 to rotate the second wrist moving portion 18 about the B-axis AxB.

4. Case where Paint Tube is Arranged on Inner Side of Arm

The case where, as illustrated in FIG. 1, the paint tube 7 is housed in the first recess portion 31 of the first wrist moving portion 17 and arranged on the outer side (upper side) of the arm 5 is described above. However, the paint tube 7 may be housed in the second recess portion 33 of the first wrist moving portion 17 and arranged on the inner side (lower side) of the arm 5.

Figure 6:
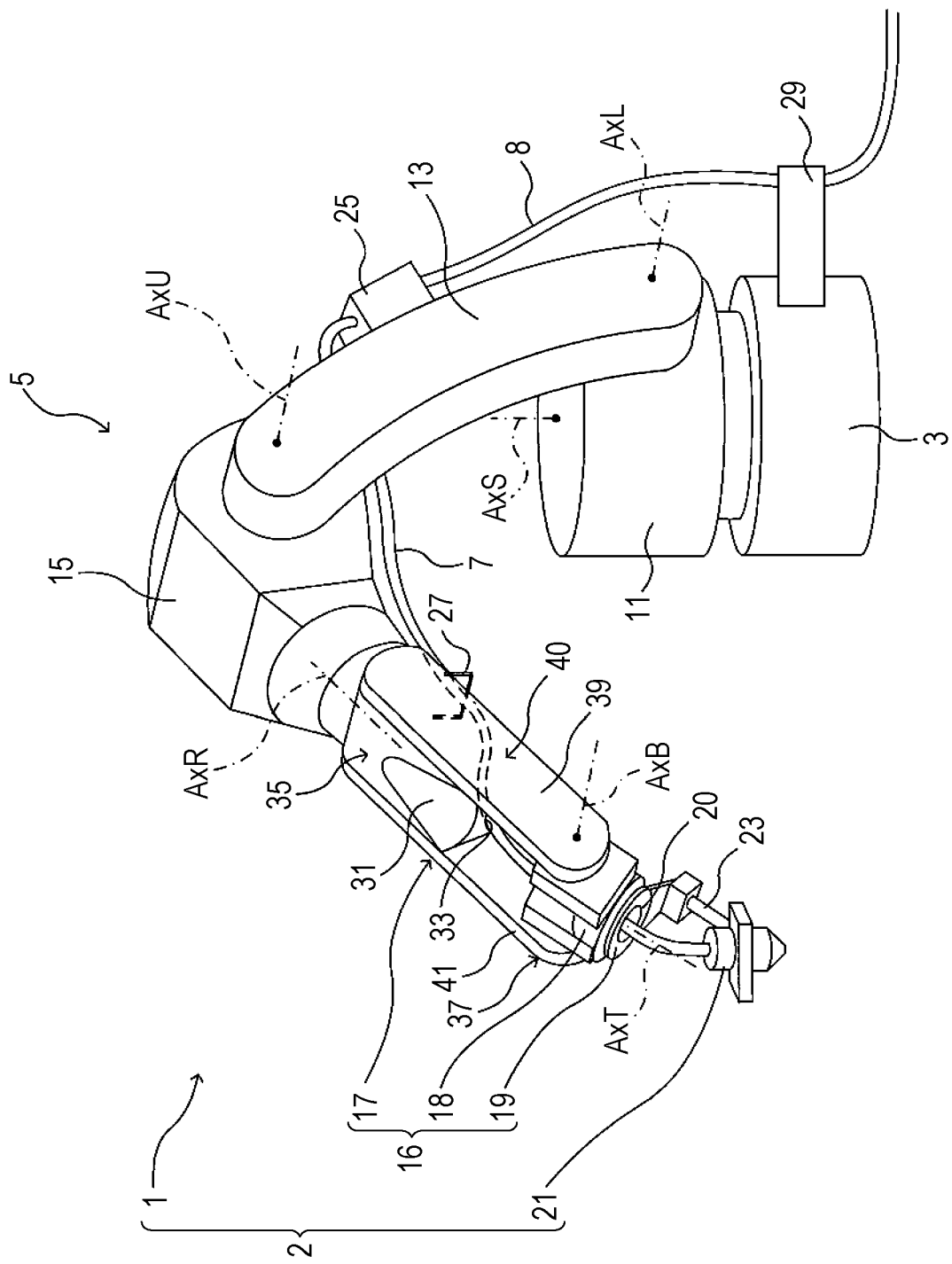
FIG. 6 is an explanatory view showing an example of the entire configuration of the robot and the robot system in a case where the arrangement position of a paint tube is set on the inner side of an arm.

If the paint tube 7 is arranged on the inner side of the first wrist moving portion 17 and the like as illustrated in FIG. 6, for example, the color change valve 25 is placed on the outer side of the lower arm 13. The paint tube 7 connected to the secondary side of the color change valve 25 is arranged in such a manner as to run along the inner side (lower side) of the upper arm 15 from the outer side of the lower arm 13, and is guided to the inner side (lower side) of the first wrist moving portion 17. The paint tube 7 is arranged from the base end portion 35 toward the tip portion 37 side while housed and guided in the second recess portion 33 provided on the inner side (lower side) of the first wrist moving portion 17. The paint tube 7 is inserted into the hollow portion 20 provided in the second wrist moving portion 18 and the third wrist moving portion 19, and connected to the spray gun 21. Holders may be provided in appropriate portions on the upper arm 15 and the first wrist moving portion 17 to guide the paint tube 7 to the second recess portion 33. In the example illustrated in FIG. 6, for example, the holder 27 is provided on the inner side (lower side) of the base end portion 35 of the first wrist moving portion 17. Moreover, a holder may be mounted in or near the second recess portion 33 in addition to or instead of the holder 27. The configuration excluding the above points is similar to FIG. 1, and a description thereof is omitted.

It is possible to reduce the total length of the paint tube 7 if the paint tube 7 is arranged on the inner side of the arm 5 in this manner as compared to the case where the paint tube 7 is arranged on the outer side as illustrated in FIG. 1. Consequently, the amounts of discharged paint and of thinner can be reduced when the color of paint is changed by the color change valve 25. Hence, a reduction in running cost, and a reduction in the load on the environment can be encouraged.

5. Effects of Embodiment

As described above, the robot 1 of the embodiment includes the second wrist moving portion 18 and the third wrist moving portion 19, to which the spray gun 21 is attached, the first wrist moving portion 17 that supports, at the tip portion thereof, the second wrist moving portion 18 and the third wrist moving portion 19 swingably about the B-axis AxB, the upper arm 15 that supports the base end portion 35 of the first wrist moving portion 17 rotatably about the R-axis AxR orthogonal to the B-axis AxB, the paint tube 7 arranged from the base end portion 35 side toward the tip portion 37 side of the first wrist moving portion 17 and connected to the spray gun 21, and the first recess portion 31 and the second recess portion 33, which are formed along the arrangement direction of the paint tube 7 between the base end portion 35 and the tip portion 37 on the one side (outer side) and the other side (inner side) in the direction orthogonal to both of the B-axis AxB and the R-axis AxR, respectively. Consequently, the following effects are exerted.

In other words, if the paint tube 7 that is connected to the spray gun 21 is arranged along the arm 5 in the robot 1, for example, a case where the paint tube 7 is arranged on the outer side of the arm 5 and a case where the paint tube 7 is arranged on the inner side of the arm 5 are conceivable. In the former case, a device related to painting work (the color change valve 25 and the like) is generally mounted in the upper part of the arm 5 (the upper arm 15 and the like). Hence, there are advantages, for example, that the work of connecting the paint tube 7 to the above device is facilitated and that the layout of the paint tube 7 can be simplified. On the other hand, there is a disadvantage, for example, that the length of the tube is increased. Moreover, in the latter case, the length of the tube can be reduced. As a result, the amounts of discharged paint and of thinner can be reduced when the color of paint is changed. Accordingly, there are advantages, for example, that the running cost can be reduced and that the load on the environment can be reduced. On the other hand, the paint tube 7 is arranged on the inner side of the arm 5. Accordingly, the interference between the arm 5 and the paint tube 7 is likely to occur. As a result, there is a disadvantage, for example, that an immobile area near the front base end portion (what is called a portion in front of the chest) of the robot 1 is increased.

As described above, there are advantages and disadvantages according to the layout of the paint tube 7. Hence, the layout of the paint tube 7 is desirably selected according to, for example, the application or use environment of the robot 1.

According to the embodiment, the first recess portion 31 and the second recess portion 33 are formed on both of the outer side and the inner side of the housing 40 of the first wrist moving portion 17. Hence, it is possible to guide the paint tube 7 along the first recess portion 31 and arrange the paint tube 7 on the outer side of the arm 5 and also guide the paint tube 7 along the second recess portion 33 and arrange the paint tube 7 on the inner side of the arm 5. In this manner, the degree of freedom in the layout of the paint tube 7 can be increased. Hence, the layout of the paint tube 7 can be selected according to, for example, the application or use environment of the robot 1.

Moreover, especially in the embodiment, the second wrist moving portion 18 and the third wrist moving portion 19 have the hollow portion 20 into which the paint tube 7 is inserted.

Consequently, there is no need to arrange the paint tube 7 around the second wrist moving portion 18 and also around the third wrist moving portion 19. In other words, the paint tube 7 can be arranged on the inner sides of the forked portions 39 and 41 of the first wrist moving portion 17. Hence, the layout of the paint tube 7 can be further simplified. Moreover, the paint tube 7 is inserted into the hollow portion 20 to enable the smooth introduction of the paint tube 7 from the spray gun 21 into the first recess portion 31 or the second recess portion 33 of the first wrist moving portion 17.

Furthermore, for example, if the paint tube 7 is mounted around the second wrist moving portion 18 and the third wrist moving portion 19, the layout of the paint tube 7 is complicated; accordingly, as a result of the occurrence of, for example, the interference between the arm 5 and the paint tube 7, the twining of the paint tube 7 around the arm 5, a collision between the arm 5 and the paint tube 7, or the arm 5 and the paint tube 7 rubbing each other, or the pulling force on the paint tube 7, the operation or range of motion of the arm 5 may be restricted. In the embodiment, the paint tube 7 is housed in the first recess portion 31 or the second recess portion 33 through the hollow portion 20. Accordingly, the layout of the paint tube 7 can be simplified. Hence, the arm 5 can be smoothly operated. At the same time, the range of motion can be increased.

Moreover, especially in the embodiment, in terms of the first recess portion 31 and the second recess portion 33, the depth of the depression in the direction orthogonal to both of the B-axis AxB and the R-axis AxR and the width in the B-axis AxB direction increase from the base end portion 35 side toward the tip portion 37 side. In this manner, the tip portion 37 is formed in the forked shape.

Consequently, the first recess portion 31 and the second recess portion 33 can be formed into a shape that permits the behavior (the operation of swinging up and down, and left and right on the inner sides of the forked portions 39 and 41 with the hollow portion 20 as a base point) of the paint tube 7 upon operating the arm 5. As a result, for example, the collision or rubbing between the paint tube 7 and the housing 40 of the first wrist moving portion 17, and the pulling force acting on the paint tube 7, which are caused when the arm 5 is operated, can be reduced. Hence, for example, the wear-out or damage of the paint tube 7 can be prevented.

Moreover, especially in the embodiment, the maximum depth D1 and the maximum width W1 of the first recess portion 31 are greater than the maximum depth D2 and the maximum width W2 of the second recess portion 33. Consequently, the following effects are exerted.

In other words, in terms of the case where the paint tube 7 is arranged on the outer side of the arm 5 and the case where the paint tube 7 is arranged on the inner side of the arm 5, demand for the former case is generally greater than the latter case due to, for example, a balance with the mounting position of the above-mentioned device related to painting work (for example, the color change valve 25).

According to the embodiment, the maximum depth D1 and the maximum width W1 of the first recess portion 31 are greater than the maximum depth D2 and the maximum width W2 of the second recess portion 33. Consequently, the first recess portion 31's function of guiding the paint tube 7 can be increased as compared to the second recess portion 33. Consequently, the degree of freedom in the layout of the paint tube 7 can be increased while the layout is caused to match the greater demand.

Moreover, especially in the embodiment, included are the T-axis motor 43 that is placed on the outer side (upper side) inside the base end portion 35 and rotates the third wrist moving portion 19 about the T-axis AxT orthogonal to the B-axis AxB, and the B-axis motor 45 that is placed on the inner side (lower side) inside the base end portion 35 and swings the second wrist moving portion 18 about the B-axis AxB. The T-axis motor 43 and the B-axis motor 45 are placed in the different positions in the R-axis AxR direction.

Consequently, the T-axis motor 43 and the B-axis motor 45 can be placed respectively inside the first recess portion 31 and the second recess portion 33, which have shapes different from each other, inside the housing 40 in such a manner as not to interfere with each other. Moreover, the thickness (the dimension in a direction perpendicular to the R-axis AxR and the B-axis AxB) of the first wrist moving portion 17 can be reduced as compared to a case where the T-axis motor 43 and the B-axis motor 45 are placed in the same position in the R-axis AxR direction. Furthermore, the T-axis motor 43 and the B-axis motor 45, which are heat sources, can be spaced apart from each other. Hence, the heat dissipation characteristics can be increased.

Moreover, especially in the embodiment, the T-axis motor 43 is placed on the outer side (upper side) in the base end portion 35 in such a manner as to be in contact via the thermal conductive sheet 49 with the inside of the flat portion 47 formed on the upper arm 15 side of the first recess portion 31. The B-axis motor 45 is placed on the inner side (lower side) in the base end portion 35 in such a manner as to be in contact via the thermal conductive sheet 53 with the inside of the flat portion 51 formed on the upper arm 15 side of the second recess portion 33.

Consequently, the T-axis motor 43 and the B-axis motor 45 can be placed on the flat portions of the housing 40. Hence, their contact areas with the housing 40 can be increased. Furthermore, these motors are in contact with the housing 40 via the thermal conductive sheets 49 and 53. Hence, the heat dissipation characteristics can be further increased.

Moreover, especially in the embodiment, the robot system 2 includes the robot 1 and the spray gun 21 attached to the third wrist moving portion 19.

Consequently, it is possible to realize the robot system 2 that can increase the degree of freedom in the layout of the paint tube 7 that is connected to the spray gun 21.

6. Modifications

Embodiments of the present disclosure are not limited to the above. Various modifications can be made to the above-mentioned embodiment within the scope that does not depart from the gist and technical idea of the present disclosure.

<6-1. Case where Placement of T-Axis Motor and B-Axis Motor is Reversed>

Figure 7:
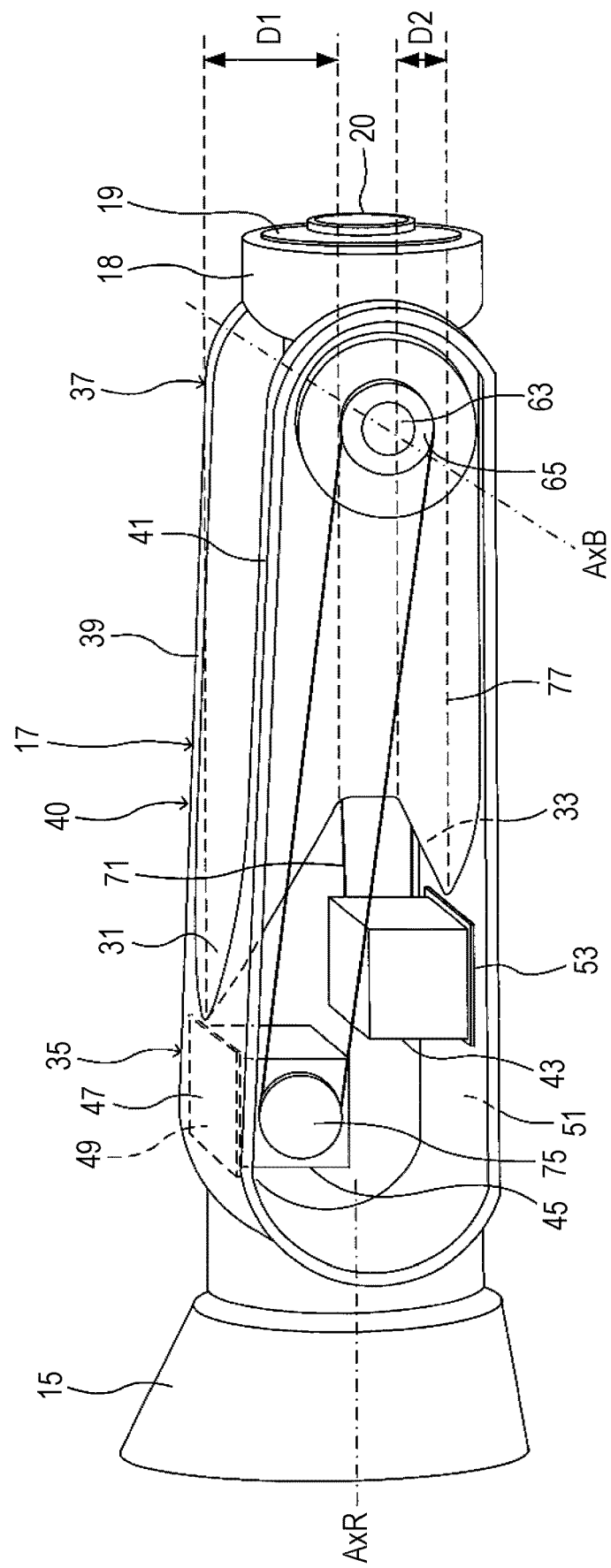
FIG. 7 is an explanatory view showing an example of the internal configuration of the first wrist moving portion in a modification where the placement configuration of the B-axis motor and the T-axis motor is reversed.

The placement of the T-axis motor 43 and the B-axis motor 45 in the first wrist moving portion 17 may be opposite to the embodiment. In other words, as illustrated in FIG. 7, the T-axis motor 43 (the example of the first motor) is placed on the other side (the lower side in FIG. 7) in the base end portion 35 of the housing 40 in such a manner as to be in contact via the thermal conductive sheet 53 (the example of the second thermal conductive sheet) with the inside of the flat portion 51 (the example of the second flat portion) formed on the upper arm side 15 of the second recess portion 33. On the other hand, the B-axis motor 45 (the example of the second motor) is placed on the one side (the upper side in FIG. 7) in the base end portion 35 of the housing 40 in such a manner as to be in contact via the thermal conductive sheet 49 (the example of the first thermal conductive sheet) with the inside of the flat portion 47 (the example of the first flat portion) formed on the upper arm 15 side of the first recess portion 31.

The configuration other than the above placement is similar to the above-mentioned embodiment. Hence, a description thereof is omitted. Also in the modification, similar effects to the above-mentioned embodiment can be obtained.

<6-2. Others>

In the embodiment, the case where the robot 1 is a painting robot is described as an example. However, application targets of the robot according to the embodiment are not limited to painting robots. For example, the robot according to the embodiment can be applied as long as it is a robot including a tube arranged along an arm thereof and connected to an end effector, such as a robot that performs welding work. In this case, examples of the tube include a power cable and a signal cable.

The meanings of terms such as "perpendicular", "orthogonal", "parallel", and "flat" in the above description should not be strictly interpreted. In other words, design and manufacturing tolerances and errors are permitted in these terms "perpendicular", "orthogonal", "parallel", and "flat". In other words, these terms indicate "substantially perpendicular", "substantially orthogonal", "substantially parallel", and "substantially flat".

Moreover, in the above description, the meanings of descriptions such as "identical", "same", "equal", and "different" in dimension, size, shape, position, and the like in terms of the external appearance should not be strictly interpreted. In other words, design and manufacturing tolerances and errors are permitted in these expressions "identical", "same", "equal", and "different". In other words, these expressions indicate "substantially identical," "substantially same," "substantially equal", and "substantially different."

Moreover, in addition to the embodiment already described above, an embodiment obtained by combining the methods of the embodiment and the modifications as appropriate can also be used. In addition, although specific illustrations are not presented, the embodiment also includes embodiments and modifications, which can be obtained by making various changes to the embodiment and the modifications within the scope that does not depart from the gist thereof.

The robot of the present disclosure may be the following first to eighth robots:

The first robot includes: a first arm portion to which an end effector is attached; a second arm portion configured to support, at a tip portion thereof, the first arm portion swingably about a first axis; a third arm portion configured to support a base end portion of the second arm portion rotatably about a second axis orthogonal to the first axis; a tube arranged from the base end portion side toward the tip portion side of the second arm portion and connected to the end effector; and a first and a second recess portion formed along an arrangement direction of the tube between the base end portion and the tip portion on one side and the other side in a direction orthogonal to both of the first and second axes, respectively.

The second robot is the first robot characterized in that the first arm portion has a hollow portion into which the tube is inserted.

The third robot is the first or second robot characterized in that the first and second recess portions increase in the depth of a depression in the direction orthogonal to both of the first and second axes and in a width in the first axis direction from the base end portion side toward the tip portion side, and has the tip portion formed in a forked shape.

The fourth robot is the third robot characterized in that a maximum depth and a maximum width of the first recess portion are greater than a maximum depth and a maximum width of the second recess portion.

The fifth robot is the fourth robot characterized by further including: a first motor placed on the one side inside the base end portion and configured to rotate the first arm portion about a third axis orthogonal to the first axis; and a second motor placed on the other side inside the base end portion and configured to swing the first arm portion about the first axis, wherein the first and second motors are placed in different positions in the second axis direction.

The sixth robot is the fifth robot characterized in that the first motor is placed on the one side in the base end portion in such a manner as to be in contact via a first thermal conductive sheet with an inside of a first flat portion formed on the third arm portion side of the first recess portion, and the second motor is placed on the other side in the base end portion in such a manner as to be in contact via a second thermal conductive sheet with an inside of a second flat portion formed on the third arm portion side of the second recess portion.

The seventh robot is the fourth robot characterized by further including: a first motor placed on the other side inside the base end portion and configured to rotate the first arm portion about a third axis orthogonal to the first axis; and a second motor placed on the one side inside the base end portion and configured to swing the first arm portion about the first axis, wherein the first and second motors are placed in different positions in the second axis direction.

The eighth robot is the seventh robot characterized in that the second motor is placed on the one side in the base end portion in such a manner as to be in contact via a first thermal conductive sheet with an inside of a first flat portion formed on the third arm portion side of the first recess portion, and the first motor is placed on the other side in the base end portion in such a manner as to be in contact via a second thermal conductive sheet with an inside of a second flat portion formed on the third arm portion side of the second recess portion.

The robot system of the present disclosure may be characterized by including: a robot having a first arm portion to which an end effector is attached, a second arm portion configured to support, at a tip portion thereof, the first arm portion swingably about a first axis, a third arm portion configured to support a base end portion of the second arm portion rotatably about a second axis orthogonal to the first axis, a tube arranged from the base end portion side toward the tip portion side of the second arm portion and connected to the end effector, and a first and a second recess portion formed along an arrangement direction of the tube between the base end portion and the tip portion on one side and the other side in a direction orthogonal to both of the first and second axes, respectively; and a spray gun attached to the first arm portion.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A robot comprising:
   a first arm portion to which an end effector is attached;
   a second arm portion configured to support, at a tip portion thereof, the first arm portion swingably about a first axis;
   a third arm portion configured to support a base end portion of the second arm portion rotatably about a second axis orthogonal to the first axis;
   a tube arranged from the base end portion side toward the tip portion side of the second arm portion and connected to the end effector; and
   a first recess portion and a second recess portion formed in a housing of the second arm portion, the first recess portion and the second recess portion being formed along an arrangement direction of the tube between the base end portion and the tip portion on one side and an other side in a direction orthogonal to both of the first and second axes, respectively, a maximum depth of the first recess portion being different from a maximum depth of the second recess portion.

2. The robot according to claim 1, wherein
   the first arm portion includes a hollow portion into which the tube is inserted.

3. The robot according to claim 1, wherein
   the first recess portion and the second recess portion have the tip portion formed in a forked shape, and
   a depth, of each of the first recess portion and the second recess portion, in the direction orthogonal to both of the first and second axes and a width, of each of the first recess portion and the second recess portion, in the first axis direction increase from the base end portion side toward the tip portion side in the forked shape.

4. The robot according to claim 3, wherein
   the maximum depth and a maximum width of the first recess portion are greater than the maximum depth and a maximum width of the second recess portion.

5. The robot according to claim 4, further comprising:
   a first motor placed on the one side inside the base end portion and configured to rotate the first arm portion about a third axis orthogonal to the first axis; and
   a second motor placed on the other side inside the base end portion and configured to swing the first arm portion about the first axis, wherein
   the first and second motors are placed in different positions in the second axis direction.

6. The robot according to claim 5, wherein
   the first motor is placed on the one side in the base end portion in such a manner as to be in contact via a first thermal conductive sheet with an inside of a first flat portion formed on the third arm portion side of the first recess portion, and
   the second motor is placed on the other side in the base end portion in such a manner as to be in contact via a second thermal conductive sheet with an inside of a second flat portion formed on the third arm portion side of the second recess portion.

7. The robot according to claim 4, further comprising:
a first motor placed on the other side inside the base end portion and configured to rotate the first arm portion about a third axis orthogonal to the first axis; and
a second motor placed on the one side inside the base end portion and configured to swing the first arm portion about the first axis, wherein
the first and second motors are placed in different positions in the second axis direction.

8. The robot according to claim 7, wherein
the second motor is placed on the one side in the base end portion in such a manner as to be in contact via a first thermal conductive sheet with an inside of a first flat portion formed on the third arm portion side of the first recess portion, and
the first motor is placed on the other side in the base end portion in such a manner as to be in contact via a second thermal conductive sheet with an inside of a second flat portion formed on the third arm portion side of the second recess portion.

9. A robot system comprising:
a spray gun; and
a robot including
a first arm portion to which the spray gun is attached,
a second arm portion configured to support, at a tip portion thereof, the first arm portion swingably about a first axis,
a third arm portion configured to support a base end portion of the second arm portion rotatably about a second axis orthogonal to the first axis,
a tube arranged from the base end portion side toward the tip portion side of the second arm portion and connected to the spray gun, and
a first recess portion and a second recess portion formed in a housing of the second arm portion, the first recess portion and the second recess portion being formed along an arrangement direction of the tube between the base end portion and the tip portion on one side and an other side in a direction orthogonal to both of the first and second axes, respectively, a maximum depth of the first recess portion being different from a maximum depth of the second recess portion.

10. The robot according to claim 1, wherein the one side corresponds to an inner side of the housing, and the other side corresponds to an outer side of the housing.

11. The robot according to claim 1, wherein
the maximum depth and a maximum width of the first recess portion are greater than the maximum depth and a maximum width of the second recess portion.

12. The robot according to claim 1, wherein
the maximum depth of the first recess portion is greater than the maximum depth of the second recess portion.

13. The robot according to claim 1, wherein
a maximum width of the first recess portion is greater than a maximum width of the second recess portion.

* * * * *